(12) United States Patent
Moriya et al.

(10) Patent No.: US 7,436,465 B2
(45) Date of Patent: Oct. 14, 2008

(54) ELECTROOPTICAL DEVICE REGION AND MANUFACTURING METHOD THEREOF, ELECTROOPTICAL DEVICE AND ELECTRONIC EQUIPMENT

(75) Inventors: Soichi Moriya, Chino (JP); Takeo Kawase, Suwa (JP)

(73) Assignee: Seiko Epson Corporation (JP)

( * ) Notice: Subject to any disclaimer, the term of this patent is extended or adjusted under 35 U.S.C. 154(b) by 649 days.

(21) Appl. No.: 11/033,307

(22) Filed: Jan. 12, 2005

(65) Prior Publication Data
US 2005/0162366 A1 Jul. 28, 2005

(30) Foreign Application Priority Data
Jan. 16, 2004 (JP) .............................. 2004-008978

(51) Int. Cl.
G02F 1/136 (2006.01)
G02F 1/1343 (2006.01)
G09G 3/34 (2006.01)
G02B 26/00 (2006.01)

(52) U.S. Cl. .......................... 349/48; 349/47; 349/144; 345/107; 359/296

(58) Field of Classification Search ................. 349/144, 349/47, 48
See application file for complete search history.

(56) References Cited

U.S. PATENT DOCUMENTS

| 6,281,952 | B1 | 8/2001 | Okamoto et al. |
| 6,300,988 | B1* | 10/2001 | Ishihara et al. ................. 349/43 |
| 6,563,554 | B2 | 5/2003 | Okamoto et al. |
| 6,900,863 | B2 | 5/2005 | Okamoto et al. |
| 7,050,132 | B2 | 5/2006 | Okamoto et al. |
| 2001/0022633 | A1* | 9/2001 | Kwak et al. .................... 349/43 |
| 2003/0147019 | A1* | 8/2003 | Sasaki .......................... 349/43 |
| 2006/0119752 | A1 | 6/2006 | Okamoto et al. |

FOREIGN PATENT DOCUMENTS

| JP | 11-242226 | 9/1999 |
| JP | 2002-353167 | 12/2002 |
| JP | 2003-508807 | 3/2003 |

OTHER PUBLICATIONS

T. Kawase et al., "Inkjet printing of polymer thin film transistors," Thin Solid Films 438-439 (2003) 279-287.

T. Kawase et al., "All-polymer thin film transistors fabricated by high-resolution ink-jet printing," 2000 International Electron Device Meeting Technical Digest, pp. 623-626.

* cited by examiner

Primary Examiner—Michael H Caley
(74) Attorney, Agent, or Firm—Harness, Dickey & Pierce, P.L.C.

(57) ABSTRACT

A region of an electrooptical device includes a substrate, an active matrix switching element formed on the substrate and a pixel electrode formed on the substrate and having a first pixel electrode coupled to the switching element AM and a second pixel electrode covering a second switching element coupled to a third electrode.

18 Claims, 7 Drawing Sheets

ELECTROOPTICAL DEVICE REGION AND MANUFACTURING METHOD THEREOF, ELECTROOPTICAL DEVICE AND ELECTRONIC EQUIPMENT

RELATED APPLICATION

This application claims priority to Japanese Application No. 2004-8978, filed Jan. 16, 2004, whose contents are explicitly incorporated herein by reference.

FIELD OF THE INVENTION

The present invention relates to a substrate for an electro optical device and a manufacturing method thereof, an electro optical device and electronic equipment.

DESCRIPTION OF THE RELATED ART

An organic thin film field-effect transistor using an organic semiconductor material has recently attracted attention as a device that can be substituted for a thin film field-effect transistor using an inorganic material such as silicon. Specifically, a macromolecular organic thin film transistor (TFT) using a macromolecular organic semiconductor material has attracted attention since it can be produced at low cost. Two documents, Takeo Kawase et al., Thin Solid Films, vol. 438-439, p. 279-287, 2003, and Takeo Kawase et al., 2000 International Electron Device Meeting Technical Digest, p. 623-626, propose a display which combines a polymer TFT as an active matrix element and a polymer-dispersed type liquid crystal as a display.

In the above-referenced documents, a pixel member and an active matrix element are separately provided, and a screen resolution of the display is about 5 ppi. In this instance, when patterning is performed by an ink-jet method (liquid discharge method, wet deposition method), it is difficult to reduce the size of polymer TFT which is the active matrix element because the minimum line width which can be patterned using the ink-jet method is 30-50 μm. Consequently, the pixel member area and an aperture become small. Therefore, it is difficult to realize a display with high density and high resolution.

SUMMARY OF THE INVENTION

The present invention has been developed in consideration of the problems mentioned above, and intended to provide a substrate for an electro optical device that has the organic semiconductor as the active matrix element and can realize the display with high resolution and a large aperture, a manufacturing method thereof and the electro optical device.

A region of an electro optical device of the present invention includes a substrate, first and second switching elements formed on the substrate, a first pixel electrode coupled to the first switching element, a second pixel electrode covering the second switching element, and a third pixel electrode coupled to the second switching element.

According to one aspect, the switching elements include thin film transistors, a wiring that supplies a signal or current to the thin film transistor, a capacitor that stores a driving state of the thin film transistor, a driving circuit that drives the thin film transistor and so on.

In the above-described aspect, the second pixel electrode can be formed on over the second switching element since the second pixel electrode is formed to cover the second switching element coupled to the third electrode. Therefore, the area of the pixel electrodes becomes large and can achieve a large aperture. Consequently, an electro optical device (display) with high density and high resolution can be realized.

Furthermore, the active matrix element made of the polymer TFT can be easily formed by the ink-jet method because the aperture will not deteriorate from patterning when using the ink-jet method.

The region of the electro optical device may include a capacitor formed between the second pixel electrode and the second switching element coupled to the third (another first) electrode.

In this aspect, the second pixel electrode not only functions as the pixel electrode but also functions as a capacitor. Therefore, wirings for forming the capacitor or capacitor electrodes do not need to be separately formed on the substrate. As such, an element configuration of the region of the electro optical device can be simplified.

In the region of the electro optical device, the switching elements may be organic thin film transistors.

In this aspect, the thin film transistors can be formed by the wet process. In the wet process, the films can be formed using atmospheric pressure vapor without using vacuum equipment. Therefore, the manufacturing cost for the region of the electro optical device can be reduced.

A method of manufacturing a portion of an electro optical device on a substrate according to the present invention includes a step of forming first and second switching elements on the substrate, a step of forming a first pixel electrode on the substrate coupled to the first switching element, a step of forming a second pixel electrode on the substrate to cover the switching element, and forming a third pixel electrode on the substrate and coupled to the first and second switching elements.

In the above-described aspect of the invention, the second pixel electrode can be formed on the formation region over the second switching element since the second pixel electrode is formed to cover the second switching element coupled to the third electrode. Therefore, the pixel electrode area becomes large and can achieve a large aperture. Consequently, an electro optical device (display) with high density and high resolution can be realized.

In the method of manufacturing the portion of the electro optical device on the substrate, the second pixel electrode may be formed by a wet process.

In this aspect, the active matrix element made of the polymer TFT that is the thin film transistor, can be easily manufactured. In the wet process, the film can be formed using atmospheric pressure vapor without using vacuum equipment. Therefore, a manufacturing cost for the portion of the electro optical device on the substrate can be reduced.

An electro optical device of the present invention includes the above-described region of the electro optical device, a counter substrate opposed to the region of the electro optical device and an electro optical layer provided between the region of the electro optical device and the counter substrate.

In this aspect, an electro optical device with a large aperture, high density and high resolution can be realized. Moreover, the electro optical device can be manufactured at low cost.

Electronic equipment of the present invention includes the above-mentioned electro optical device. In this aspect, the electronic equipment with a large aperture, high density and high resolution can be realized. Moreover, the electronic equipment can be manufactured at low cost.

DETAILED DESCRIPTION

Embodiments of the present invention will now be described in detail.

An illustrative embodiment of the present invention directed to the structure of a region of an electro optical device will be described with reference to FIG. 1 and FIG. 2.

In order to make each member or layer recognizable, the figures have not been drawn to scale.

Figure 1:
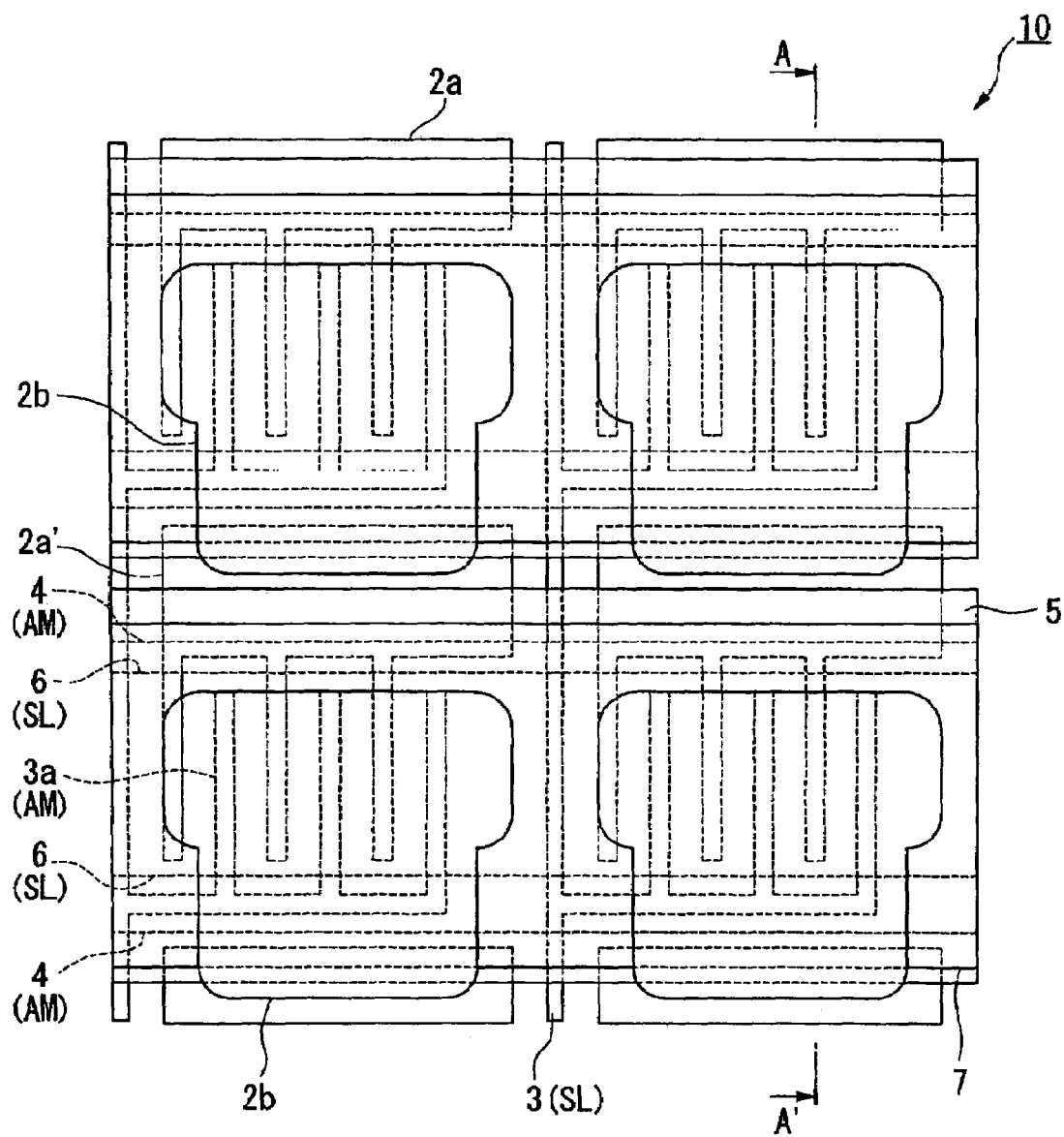
FIG. 1 is a plane view of a region of an electro optical device including a substrate according to a first embodiment of the present invention.

FIG. 1 is a plane view of for a region of the electro optical device showing its main features. FIG. 2 is a sectional view along the line A-A' of FIG. 1.

As shown in FIG. 1, a region of the electro optical device 10 has a signal line SL, an active matrix element AM (switching element) and a first pixel electrode 2a. The signal line SL is a wiring for supplying current to drive the active matrix element AM and includes a data line 3 and a gate line 6. The active matrix element AM functions as a thin film transistor for driving the first pixel electrode 2a and a second pixel electrode 2b. The active matrix element AM includes a source electrode 3a, a semiconductor layer 4, a gate insulating film 5 and a gate electrode 6a. The active matrix element AM is an organic thin film transistor made of organic material, which will be described in more detail below.

The source electrode 3a and the first pixel electrode 2a are formed like the teeth of a comb and they can be used for alignment of the active matrix element AM.

Figure 2:
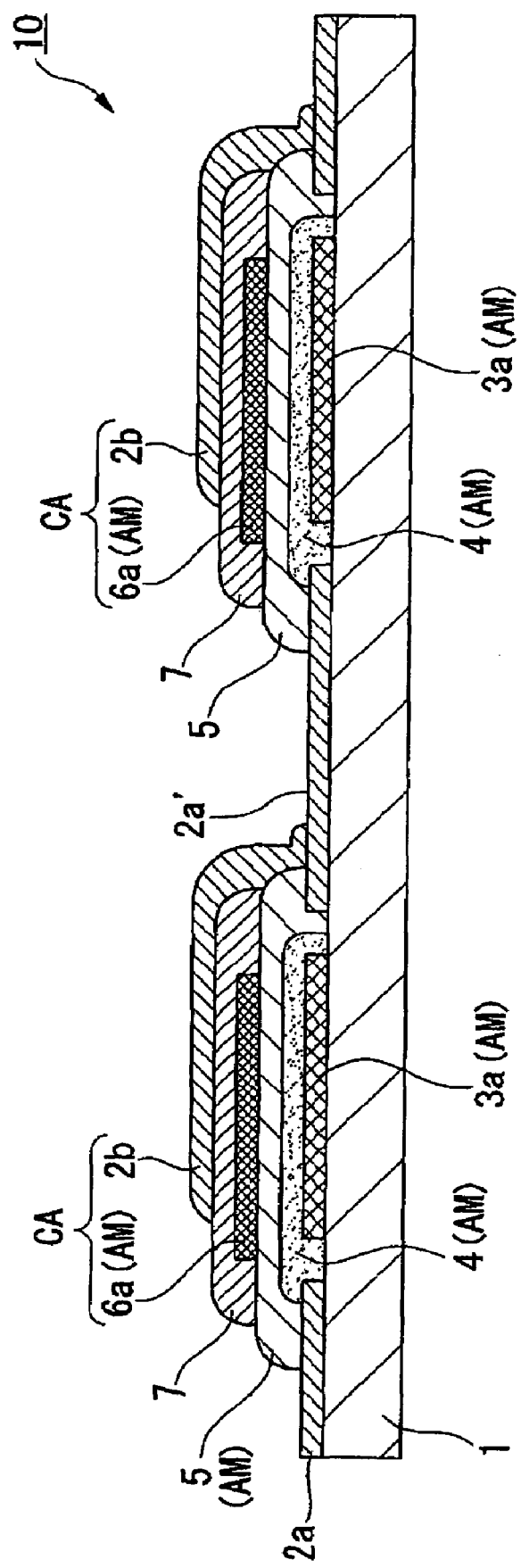
FIG. 2 is a sectional view of the region of the electro optical device according to the first embodiment of the present invention.

In FIG. 1 and FIG. 2, the data line 3 and the source electrode 3a are made of the same material. Also, the gate line 6 and the gate electrode 6a are made of the same material.

As shown in FIG. 2, the region of the electro optical device 10 is made such that the first pixel electrode 2a, the source electrode 3a, the semiconductor layer 4, the gate insulating layer 5, the gate electrode 6a, an interlayer insulating layer 7 and the second pixel electrode 2b are stacked on the substrate 1, respectively.

In this example, the first pixel electrode 2a is directly coupled to a drain region of the semiconductor layer 4. In this configuration, the first pixel electrode 2a serves as a drain electrode of the semiconductor layer 4.

The second pixel electrode 2b is formed on an upper face (formation region) of the interlayer insulating layer 7 and is electrically coupled to a third pixel electrode 2a' (other first pixel electrode). The second pixel electrode 2b is made of a conductive application layer formed by a liquid discharge method such as an ink-jet method or a wet deposition method.

Furthermore, the second pixel electrode 2b and the gate electrode 6a form a capacitor CA, with the interlayer insulating layer 7 interposed therebetween. The capacitor CA stores a switching state of the active matrix element AM.

In the region of the electro optical device 10, the data line 3 is electrically coupled to the source electrode 3a of the active matrix element AM. A picture signal is sequentially supplied to the data line 3 or to a group of the data lines 3 that lie next to each other. The gate line 6 is electrically coupled to the gate electrode 6a of the active matrix element AM. A scan signal in pulse form is sequentially supplied to a plurality of the gate lines 6 at a certain time. Furthermore, the first pixel electrode 2a serves as a drain electrode of the active matrix element AM. At a certain time, the picture signal supplied from the data line 3 is written when the active matrix element AM is turned on for a certain period by applying a pulse voltage to the gate electrode 6a. The first pixel electrode 2a and the second pixel electrode 2b are coupled to each other and have the same electric potential. When the picture signal is input, a pixel region corresponding to the first pixel electrode 2a and the second pixel electrode 2b is displayed according to the picture signal.

Next, the manufacturing method of a portion of the electro optical device 10 on a substrate is described with reference to FIGS. 1 and 2.

First, the first pixel electrode 2a, the data line 3 and the source electrode 3a are formed on the substrate 1. As the substrate 1, for example, a glass substrate, a plastic substrate (a resin substrate) made of the following material: polyethylene terephthalate (PET), polyethylene naphthalate (PEN), polyether sulfone (PES), aromatic polyester (liquid crystal polymer), polyimide (PI) and the like, a quartz substrate, a silicon substrate, a metal substrate, a gallium arsenide substrate and the like can be used. When the thin film transistor has flexibility, the plastic substrate or the metal substrate can be used as the substrate 1.

The first pixel electrode 2a, the data line 3 and the source electrode 3a may be made of any commonly used material for electrodes. For example, Cr, Al, Ta, Mo, Nd, Cu, Ag, Au, Pd, In, Ni, Nd, Co and alloys using such metals may be used. Any commonly used metal, alloy or metal oxide can be employed. Also, a liquid solution in which metal particles are dispersed, a polymer composite that contains conductive particles or a conductive organic material each can be used as a material for the electrodes. When the electrodes are formed and combined with a polymer organic semiconductor, an electrode material that has a large work function is appropriate for injecting positive holes (carrier) into the organic semiconductor since the polymer organic semiconductor is p-type semiconductor.

Next, the semiconductor layer 4 is formed on the substrate 1 so as to cover the source electrode 3a.

As a semiconductor material, both a low-molecular organic semiconductor material and the polymer organic semiconductor material can be used.

As the polymer organic semiconductor material, poly (3-alkylthiophene), poly (3-hexylthiophene) (P3HT), poly (3-octylthiophene), poly (2,5-thienylene vinylene) (PTV), poly (paraphenylene vinylene) (PPV), poly (9,9-dioctylfluorene-co-bis-N,N'-(4-methoxyphenyl)-bis-N,N'-phenyl-1,4-phenylenediamine) (PFMO) poly(9,9-dioctylfluorene-cobenzothiadiazole) (BT), fuluorene-triallylamine copolymer, triallylamine based polymer, fuluorene-bithiophene copolymer and the like can be used.

As the low-molecular organic semiconductor material, for example, C60, metal phthalocyanine or its substituted derivatives, acene molecule material such as anthracene, tetracene, pentacene, hexacene and the like, and □-oligothiophene such as quaterthiophene (4T), sexithiophene (6T), octthiophene (8T), dihexylquaterthiophene (DH-4T) and dihexylsexithiophene (DH-6T) and the like can be named.

In this embodiment, the semiconductor layer can be formed by the ink-jet method. In this case, the semiconductor material is dispersed or dissolved in a solvent and this liquid material is discharged so as to form a certain pattern.

Next, the gate insulating layer 5 is formed so as to cover the semiconductor layer 4 and the first pixel electrode 2a.

The gate insulating layer 5 may be any commonly used gate insulating material. As an organic material, polyolefin polymer such as polymethyl methacrylate, polyvinyl phenol, polyimide, polystyrene, polyvinyl alcohol, polyvinyl acetate and polyisobutylene can be used. The gate insulating layer is formed by, for example, a wet process such as a spin coat method or the ink-jet method. As an inorganic material, metal oxides of silica, silicon nitride, aluminum oxide, tantalum oxide and the like, and metal compound oxide such as barium strontium titanate, zirconium lead titanate and the like may be used. The gate insulating layer can be formed by thermal oxidation, chemical vapor deposition (CVD), spin-on glass (SOG) and others. Alternatively, a silicon nitride film or silicon film can be formed by a wet process, using polysilazane.

Next, the gate electrode 6a is formed on the gate insulating layer 5.

A material for the gate electrode 6a may be any commonly used material for electrodes. For example, Cr, Al, Ta, Mo, Nd, Cu, Ag, Au, Pd, In, Ni, Nd, Co and alloys using such metals may be used. Any commonly used metal, alloy and metal oxide can be employed. Also, a liquid solution in which metal particles are dispersed, a polymer composite that contains conductive particles or a conductive organic material each can be used as a material for the electrodes.

Next, the interlayer insulating layer 7 is formed on the gate insulating layer 5 so as to cover the gate electrode 6a. To form the interlayer insulating layer 7, the same materials as described above with respect to the gate insulating layer 5 can be used.

Finally, the second pixel electrode 2b is formed.

As the second pixel electrode 2b, a conductive application layer can be used. Also, a liquid solution in which metal particles are dispersed, a polymer composite that contains conductive particles or the conductive organic material each can be used for the electrode.

Though the material for the second pixel electrode 2b may be that same as that of the first pixel electrode 2a or may be different from that of the first pixel electrode 2a, conductivity between the second pixel electrode 2b and the first pixel electrode 2a needs to be obtained. For this reason, materials that result in minimum contact resistance should be selected. As described above, the portion of the electro optical device 10 on the substrate 1 has the first pixel electrode 2a and the second pixel electrode 2b, and the second pixel electrode 2b is formed over the active matrix element AM. Therefore, overall area of the pixel electrode becomes large and it can achieve a large aperture as well as solve the above-mentioned problem of small aperture. Consequently, an electro optical device (display) with high density and high resolution can be realized.

Furthermore, the active matrix element made of the polymer TFT can be formed easily by the ink-jet method because the aperture will not deteriorate from patterning when using the ink-jet method.

Moreover, the capacitor CA is formed between the second pixel electrode 2b and the switching element coupled to the third pixel electrode 2a'. This means that the second pixel electrode 2b not only functions as the pixel electrode but also functions as a capacitor. Therefore, wirings for forming the capacitor CA or capacitor electrodes do not need to be formed separately on the substrate. Also, the element configuration of the portion of the electro optical device 10 on the substrate can be simplified.

Since the active matrix element AM is an organic thin film transistor, it can be formed by a wet process. In the wet process, the film can be formed using atmospheric pressure vapor without using vacuum equipment. Therefore, costs for manufacturing of the portion of the electro optical device 10 on the substrate 1 can be reduced. In addition, the second pixel electrode 2b can be formed by the wet process so that the same cost cutting effect can be realized.

An electrophoretic display device of the present invention will be described with reference to FIGS. 3 through 5. As the electro optical device, the electrophoretic display device having the organic TFT as the active matrix element will be described.

Figure 3:
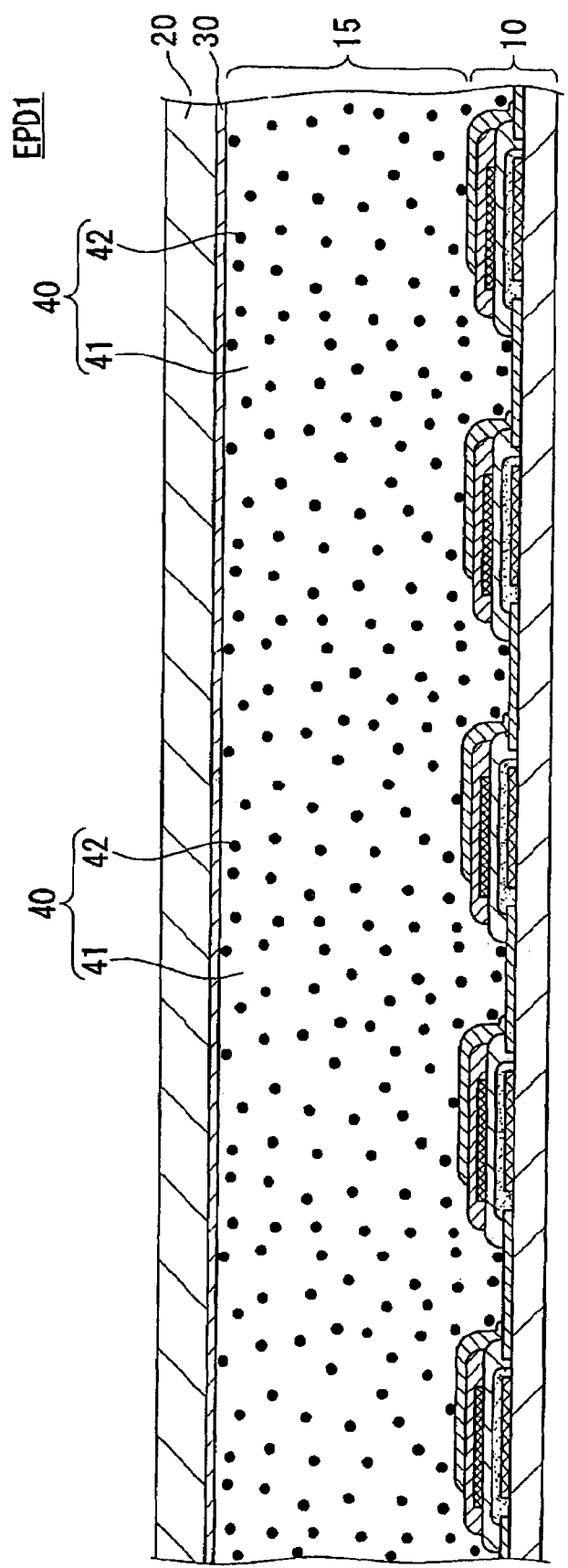
FIG. 3 is a sectional view showing structures of an electro optical device according to a first embodiment of the present invention.
Figure 4:
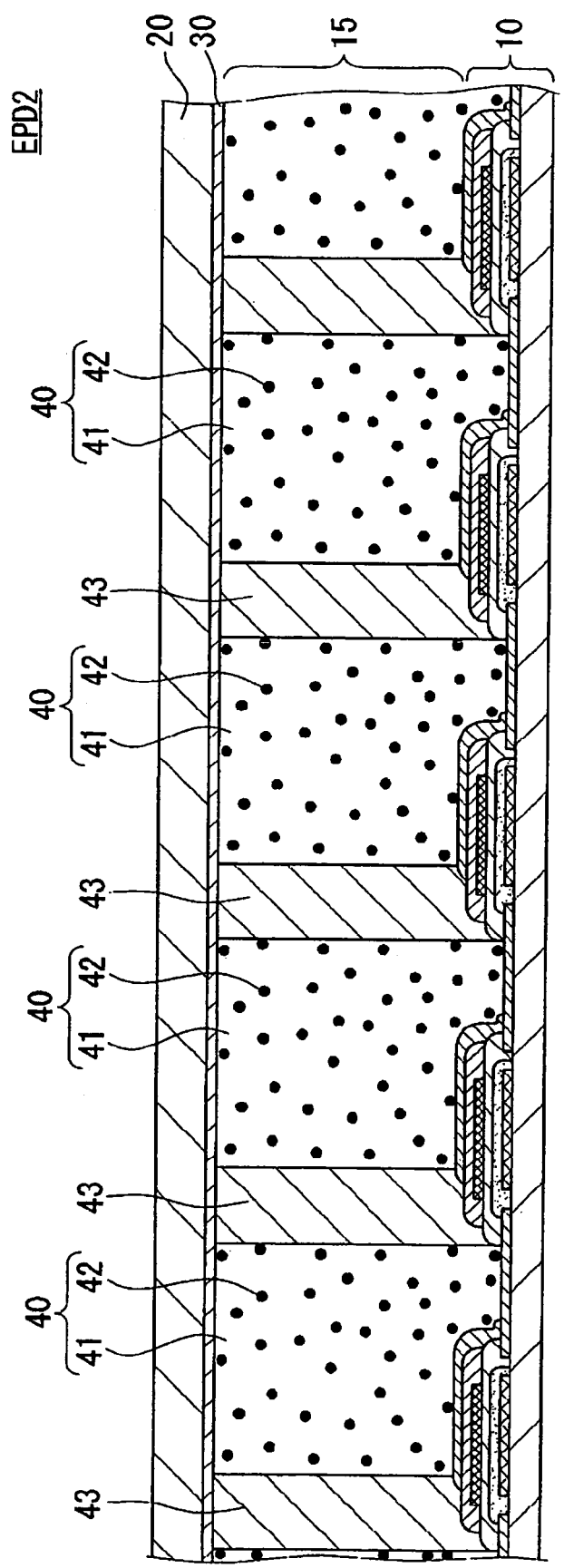
FIG. 4 is a sectional view showing structures of an electro optical device according to a second embodiment of the present invention.
Figure 5:
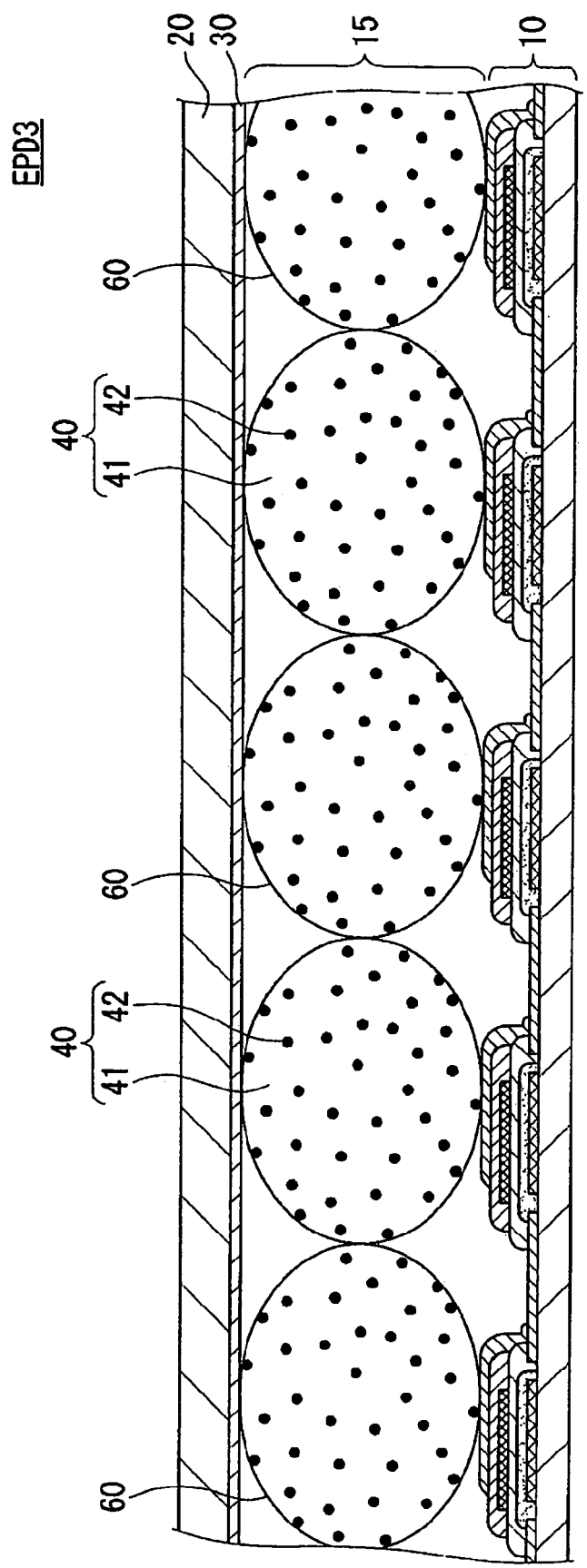
FIG. 5 is a sectional view showing structures of an electro optical device according to a third embodiment of the present invention.

FIGS. 3 through 5 provide a sectional view and partly a flat view showing structures of embodiments of the electrophoretic display according to illustrative embodiments of the invention. In order to make elements of the structures recognizable, the figures have not been drawn to scale. Elements and structures found in FIGS. 3 through 5, which have been described above for the region of the electro optical device 10 are given the same reference numerals and explanations thereof have been omitted for purposes of brevity.

An electrophoretic display device EPD1 according to a first embodiment has a region of an electro optical device 10, a counter substrate 20 and an electrophoretic layer (electro optical layer) 15, as shown in FIG. 3. In this example, the counter substrate 20 can be made of transparent material such as a glass substrate or a resin film substrate. The electrophoretic layer 15 is formed on a common electrode 30. The counter substrate 20 is formed on a face of the common electrode 30. The electrophoretic layer 15 is interposed between the region of the electro optical device 10 and the counter substrate 20. The region of the electro optical device 10 and the counter substrate 20 are adhered together with a sealant member (not shown in the figures) that is formed so as to surround a display region. A gap made by a spacer (not shown in the figures) is provided between the region of the electro optical device 10 and the counter substrate. In the electrophoretic display device EPD1 according to this embodiment, the electrophoretic layer 15 is formed in which an electrophoretic dispersion liquid 40 including a dispersion medium 41 and an electrophoretic particle 42 is enclosed in a space formed by the substrate 10, the substrate 20 and the sealant member.

Next, the electrophoretic dispersion liquid 40 including the dispersion medium 41 and the electrophoretic particle 42 will be described. The electrophoretic dispersion liquid 40 may have a dyed dispersion medium 41 in which the electrophoretic particle 42 can be dispersed.

The electrophoretic particle 42 is a substantially spherical particle with a diameter of 0.01-10 μm and made of an inorganic oxide or inorganic hydroxide. The electrophoretic particle 42 has a different color (including white and black) from that of the dispersion medium 41. An electrophoretic particle 42 made of oxide or hydroxide has a specific surface isoelectric point and its surface density of charge (amount of charge) varies depending on a hydrogen-ion exponent pH of the dispersion medium 41.

The surface isoelectric point is a point at which algebraic sum of charges of an amphoteric electrolyte in solution becomes zero and is shown by the hydrogen-ion exponent pH. For example, when a pH of the dispersion medium 41 is equal to the surface isoelectric point of the electrophoretic particle 42, an effective charge of the particle is zero and the particle will not respond to an outside electric field. When the pH of the dispersion medium 41 is lower than the surface isoelectric point of the particle, the surface of the particle is positively charged as shown in formula (1) below. In contrast, when the pH of the dispersion medium 41 is higher than the surface isoelectric point of the particle, the surface of the particle is negatively charged as shown in the formula (2) below.

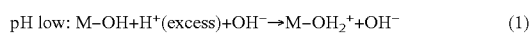
pH low: M–OH+H$^+$(excess)+OH$^-$→M–OH$_2^+$+OH$^-$ (1)

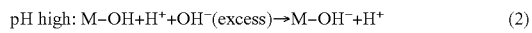
pH high: M–OH+H$^+$+OH$^-$(excess)→M–OH$^-$+H$^+$ (2)

As a difference between the pH of the dispersion medium 41 and the surface isoelectric point of the particle increases, the amount of particle charge increases according to the above-mentioned reaction formula. However, when the difference reaches a certain point, the amount of charge becomes substantially saturated and will not change even when the pH is further increased or decreased. The value of the difference depends on the type, size and shape of the particle. However, when the value of the difference is more than one, the amount of charge of almost all the particles will be saturated.

As the above-mentioned electrophoretic particle 42, for example, titanium dioxide, zinc oxide, magnesium oxide, colcothar, aluminum oxide, black low-oxide titanium, chrome oxide, boehmite, FeOOH, silicon dioxide, magnesium hydrate, nickel hydroxide, zirconium oxide, copper oxide and the like can be used.

Moreover, the electrophoretic particle 42 can be used with or without application of a surface treatment. For example, the surface of the particle may be coated with a polymer such as an acrylic resin, an epoxy resin, a polyester resin and a polyurethane resin. The surface of the particle may be treated using a bonding agent as a silane based, a titanate based, an aluminum based or a fluorine agent. Furthermore, the surface of the particle may be graft polymerized with an acrylic monomer, a styrene monomer, an epoxy monomer, an isocyanate monomer or other monomer. The surface of the particle may be treated with one or more of the above-mentioned treatments.

A nonaqueous organic solvent such as carbon hydride, halogenated carbon hydride or ether may be used as the dispersion medium 41. The nonaqueous organic solvent may be colored with colorant such as spirit black, oil yellow, oil blue, oil green, Bali first blue, macrorex blue, oil brown, Sudan black, first orange or the like. The color of the dispersion medium is different from the color of the electrophoretic particle 42.

For example, as the above-mentioned carbon hydride, alkane such as hexane, petroleum ether, petroleum benzin, petroleum naphtha, ligroin, dodecylbenzene and other alkylbenzene, industrial gasoline, coal oil, solvent naphtha, 1-octen and other unsaturated hydrocarbon, biphenyl derivative, bicyclohexyl derivative, decalin derivative, cycrohexylbenzene derivative, tetralin derivative and other derivatives can be used.

As the above-mentioned halogenated carbon hydride, chloroform, dichloroethane, trichloroethane, tetrachloroethane, dichloroethylene, trichloroethylene, tetrachloroethylene, dichloropropane, trichloropropane, monochloroalkane types, chlorofluoroalkane types, perfluoroalkane types, perfluorodecalin types and perfluoroalkylbenzene types can be used.

As the above-mentioned ether, dihexylether and other dialkylether, phenetol and other alkoxybenzene, dioxane and other cyclic ether, dimethoxyethane and other ethylene glycol derivatives, diethylene glycol, diethyl ether and other diethylene glycol derivatives, glyceryl ether types, acetal types and the like can be used.

In addition to the above-mentioned carbon hydride, halogenated carbon hydride and ether, butyl acetate and other ester, methyl ethyl ketone and other keton, carboxylic acid types, alkylamine types, dodecamethyl-pentasiloxane and other siloxane, dimethylformamide (DMF), 2,5-Dimethoxy-α-methylphenethylamine (DMA), N-methyl-2-pyrrolidone (NMP), dimethyl sulfoxide (DMSO), silicone oil, a liquid crystal compound, a liquid crystal mixture and the like can be used.

For the dispersion medium 41, one of the above-mentioned organic compounds or mixtures in which more than two types of organic compound are combined can be used.

A pH adjuster to adjust pH is added to the dispersion medium 41 to make the pH of the dispersion medium 41 different from the surface isoelectric point of the electrophoretic particle 42. At this time, if the pH of the dispersion medium 41 is more than 6 (in other words, the dispersion medium 41 is in an alkaline state), the particles tend to agglutinate by an agglutinative action of hydroxide hydroxyl. Therefore, it is preferred that the dispersion medium 41 is not over 7 (in other words, the dispersion medium 41 is acidic state). Furthermore, the pH of the dispersion medium 41 can adjusted such that the amount of particle charge is saturated. For example, the amount of particle charge can be saturated by making the difference between the pH of the dispersion medium 41 and the surface isoelectric point of the electrophoretic particle equal to or greater than 1.

More particularly, when a material having the surface isoelectric point of over 6 such as titanium dioxide, zinc oxide, magnesium oxide and aluminum oxide is used as the electrophoretic particle 42, the pH of the dispersion medium 41 can be set to be lower than the surface isoelectric point of the electrophoretic particle by 1 or more points. In this case, the particle is positively charged in the dispersion medium 41. In contrast, with a material having the surface isoelectric point of less than 6 such as silicon dioxide, the pH of the dispersion medium 41 can be lower than the surface isoelectric point of the particle by 1 or more. Or, the pH of the dispersion medium 41 is less than 7 and is higher than the surface isoelectric point of the particle by 1 or more.

As the above-mentioned pH adjuster, for example, formic acid, acetic acid, propionic acid, butyric acid, valeric acid and other organic monocarboxylic acid, oxalic acid, malonic acid and other dicarboxylic acid, hydrochloric acid, sulfuric acid and other inorganic acid, ammonia water, methylamine and other alkylamine, aniline, diethyl aniline, hydroxylamine types, sodium hydrate and other inorganic bases can be used.

Furthermore, a macromolecule interfacial active agent is added to the dispersion medium 41. With osmotic effect and entropy effect, the macromolecule interfacial active agent will contribute greatly to stabilize dispersion of the particle compared with sticking a low-molecular interfacial active agent by to the electrophoretic particle 42 and forming an absorbing layer on the particle surface.

The following anion-based, cation-based and nonionic-based macromolecule interfacial active agents may be used.

For example, as the anion-based macromolecule interfacial active agent, styrene-maleic anhydride copolymer and other carboxylic acid containing copolymer, polyacrylic acid and other polycarboxylic acid can be used. As the cation-based macromolecule interfacial active agent, polyethylene imine types, polyvinyl imidazoline types, polyvinyl pyridine and the like can be used. As the nonionic-based macromolecule interfacial active agent, polyvinyl alcohol, polyacrylamide, hydroxyfatty acid oligomer, polyethylene glycol distearate, polyethylene glycol dimethyl ether, polystyrene, poly (1-vinyl pyrrolidone-co-vinylacetate) and the like can be used.

For the macromolecule interfacial active agent, one of the above-mentioned high-polymer materials or a mixture in which more than two types of the high-polymer materials are combined can be used.

The following anion-based, cation-based, nonionic-based and fluoric-based low-molecular interfacial active agent can be used together with the above-mentioned macromolecule interfacial active agent.

For example, as the anion-based low-molecular interfacial active agent, sodium dodecylbenzenesulfonate and other alkylbenzenesulfonate, sodium lauryl acid and other carboxylate, sodium lauryl sulfate and other sulfate, sodium lauryl nitrate and other nitrate can be used. As the cation-based low-molecular interfacial active agent, cetyltrimethylammonium chloride and other quaternary ammonium, dodecylpyridinium bromide and other pyridinium salt, lauryl amine hydrochloride and other amine salt can be used. As the nonionic-based low-molecular interfacial active agent, sorbitan trioleate and other polyalcohol fatty acid ester can be used. As the fluoric-based low-molecular interfacial active agent, sodium perfluorodecanoate and other perfluorocarboxylate, perfluorononylalcohol and other perfluoroalcohol and the like can be used. A specific gravity of the dispersion medium 41 and a specific gravity of the particle are preferably set to be substantially the same in order to avoid having the particle precipitate by gravity.

As described above, the electrophoretic display device EPD1 can achieve an electro optical device with a large aperture, high density and high resolution since it has the above-described substrate for the electro optical device 10. Furthermore, the manufacturing cost for the electro optical device can be reduced.

As shown in FIG. 4, in an electrophoretic display device EPD2 according to a second embodiment, a partition wall 43 that is lattice-shaped in a plane view and has a certain thickness is provided between the substrate for the electro optical device 10 and the counter substrate 20. In addition, the above-described electrophoretic dispersion liquid 40 is enclosed between partition walls 43. Other structures or configurations exist which are the same as those in the first embodiment and explanations thereof have been omitted for purposes of brevity.

The electrophoretic display device EPD2 has the same effects and benefits as the above-described electrophoretic display device EPD1.

As shown in FIG. 5, in an electrophoretic display device EPD3 according to a third embodiment, the electrophoretic dispersion liquid 40 is encapsulated in resin-film capsules and made as microcapsules. Each microcapsule 60 is provided between the substrate for the electro optical device 10 and the counter substrate 20. The size of the microcapsule 60 is substantially the same as the size of a single pixel including the first pixel electrode 2a and the second pixel electrode 2b. Multiple microcapsules 60 are provided to cover the entire display region. In fact, each microcapsule 60 closely contacts an adjacent microcapsule 60. Therefore, the display region is covered with the plurality of microcapsules 60 leaving no space between. Other structures or configurations exist which are the same as those in the first embodiment and explanations or descriptions thereof have been omitted for purposes of brevity.

The electrophoretic display device EPD3 has the same effects and benefits as the above-described electrophoretic display device EPD1 and the electrophoretic display device EPD2.

The above-described electrophoretic display device can be applied to various electronic equipment having display parts. Examples of electronic equipment having the above-described electrophoretic display will be now explained.

First, the electrophoretic display device according to the present invention can be applied to a mobile (portable) personal computer.

Figure 6:
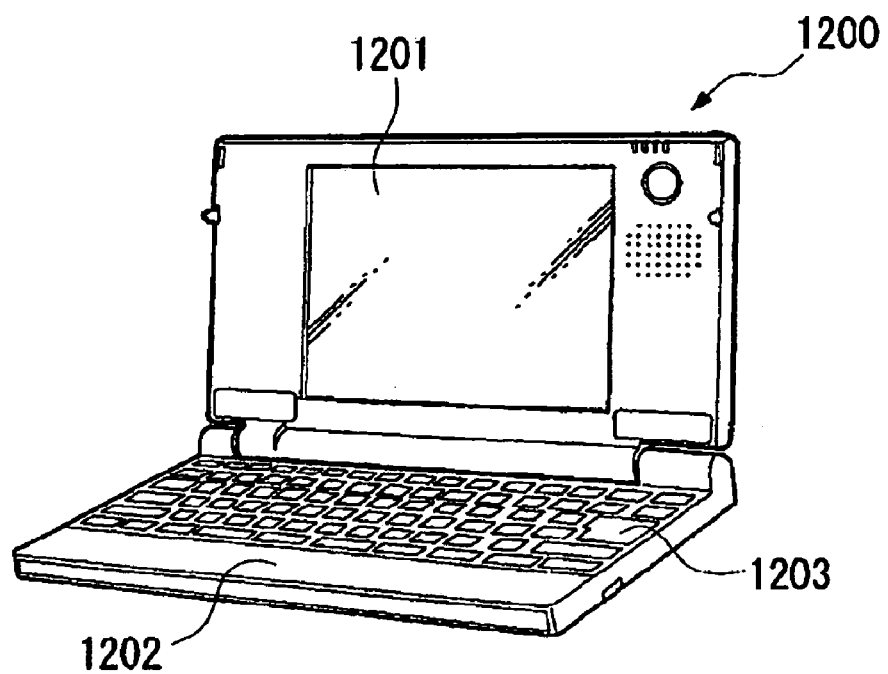
FIG. 6 shows an example of electronic equipment according to the present invention.

FIG. 6 provides a perspective view of a personal computer showing its structure. A personal computer 1200 has the electrophoretic display device according to the present invention as a display part 1201. The personal computer 1200 also has a keyboard 1203 and a main body 1202.

Figure 7:
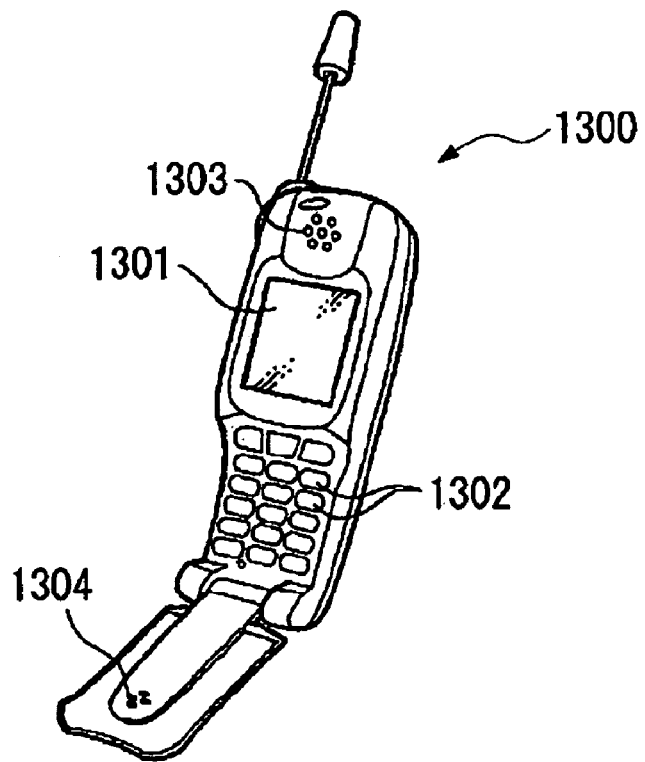
FIG. 7 shows an example of the electronic equipment according to the present invention.

Also, the electrophoretic display device according to the present invention can be applied to a cellular phone. FIG. 7 provides a perspective view of a cellular phone showing its structure. A cellular phone 1300 has the electrophoretic display device according to the present invention as a small size display part 1301. The cellular phone 1300 also has a plurality of manual operation buttons 1302, an ear piece 1303 and a mouth piece 1304.

Figure 8:
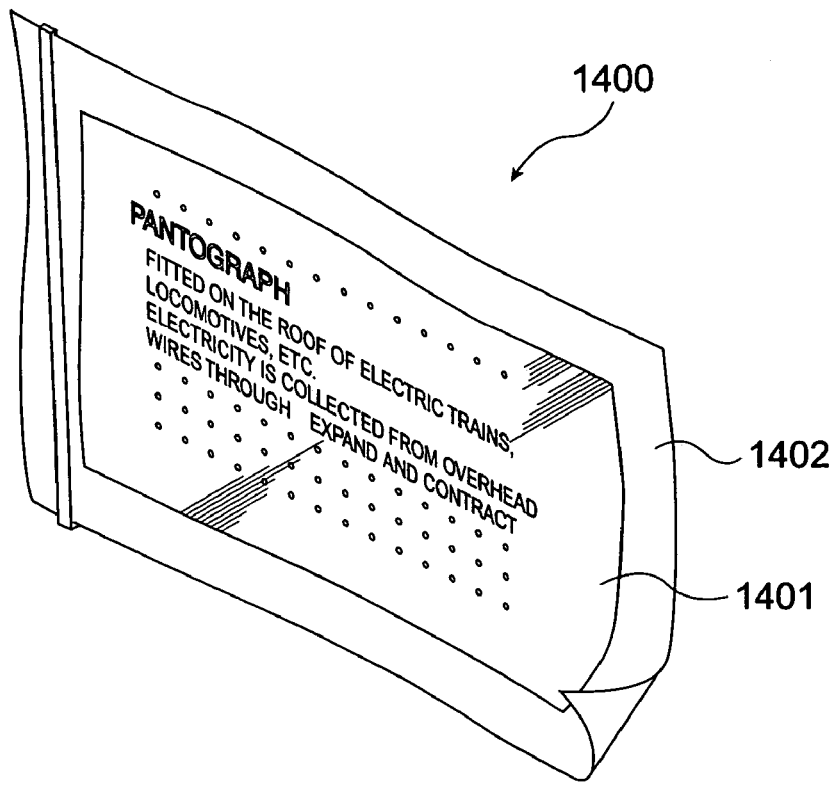
FIG. 8 shows an example of the electronic equipment according to the present invention.

In addition, the electrophoretic display device according to the present invention can be applied to a flexible electronic paper. FIG. 8 provides a perspective view of the electronic paper showing its structure. Electronic paper 1400 has the electrophoretic display device according to the present invention as a display part 1401. The electronic paper 1400 has a main body 1402 made of a sheet which is rewritable and has texture like paper and flexibility.

Figure 9:
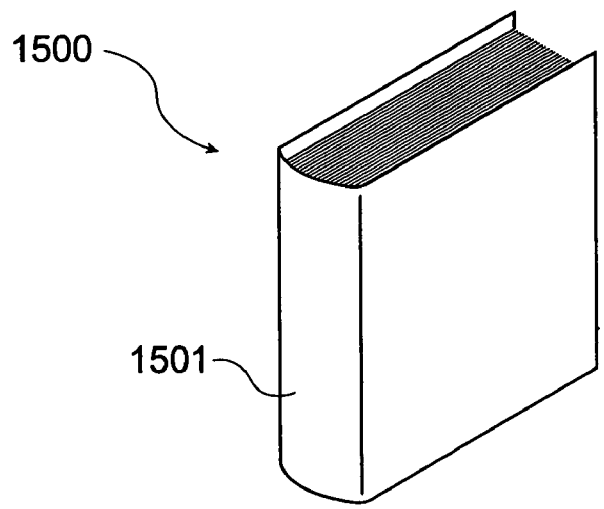
FIG. 9 shows an example of the electronic equipment according to the present invention.

FIG. 9 provides a perspective view of an electronic notebook showing its structure. An electronic notebook 1500 has a plurality of the above-described electronic papers 1400 bound up and sandwiched between a cover 1501. The cover 1501 has a display data input means (not shown) for receiving as input, for example, display data sent from an external device. This makes it possible to change or update displayed contents according to the display data while the electronic papers are bound up.

In addition to the above-described examples, a liquid crystal television, a view finder type or direct view type video tape recorder, a car navigation device, a pager, an electronic databook, a calculator, a word processor, a work station, a videophone, a point-of-sale terminal, equipment having a touch panel and the like are other examples of electronic equipment that may have an electrophoretic display device according to the present invention.

The present invention is not limited to the above-described embodiments and may be applied to various types of modifications within the scope and spirit of the present invention.

PRACTICAL EXAMPLE

The substrate for the electro optical device 10 was manufactured and the advantageous effects of the present invention were demonstrated.

First, an Au thin film of about 10-100 nm thick was formed on the substrate 1 by commonly used spattering and plating. After the film was formed, the first pixel electrode 2a and the data line 3 were formed on the substrate 1 by patterning with photolithography. Alternatively, the first pixel electrode 2*a* and the data line 3 could be directly formed on the substrate 1 by a print process applying the ink-jet method using poly (ethylenedioxythiphene) (PEDOT). The plating and the ink-jet method do not use vacuum equipment. Therefore, the portion of the electro optical display on the substrate can be manufactured reasonably.

Next, a semiconductor layer 4 of 10-500 nm thick was formed by the ink-jet method applying a polymer semiconductor F2T2 and polyallylamine to an area between the source electrode 3*a* and the first pixel electrode 2*a*, which is going to serve as a channel part of the polymer TFT.

Then, the gate insulating film 5 was formed by the ink-jet method. At this time, polymethyl methacrylate (PMMA) butyl acetate solution or polyisobutylene cyclohexane solution was applied and solvent was evaporated by heat.

Next, a 100-5000 nm thick film was formed to cover the semiconductor layer 4.

And then, the gate electrode 6*a* was formed by applying PEDOT solution or a silver colloidal dispersion liquid on the gate insulating film 5 by the ink-jet method.

Next, an interlayer insulating film 7 of about 100-500 nm thick was formed by applying polysilazane xylene solution or polyvinyl alcohol (PVA) solution by the ink-jet method to cover the gate electrode 6*a* (gate line 6) and heating it.

Next, a conductive application film was formed on the interlayer insulating film 7 by applying the PEDOT solution or the silver colloidal dispersion liquid by the ink-jet method and evaporating it. The second pixel electrode 2*b* having a thickness of about 10-1000 nm was formed so as to conduct to the first pixel electrode 2*a*. In this way, the conductive application film that was electrically coupled to the first pixel electrode 2*a* was formed on the active matrix element AM and an effective area of the pixel was increased. This can improve the aperture size. Moreover, the capacitor CA was formed between the second pixel electrode 2*b* and an anterior gate electrode 6*a* by forming the conductive application film on the anterior gate electrode 6*a* that was provided anterior to the gate electrode 6*a*. Electric charge stored in the second pixel electrode 2*b* was retained in the capacitor CA when the active matrix element AM was not selected. As a result, leakage was decreased thereby preventing deterioration.

Next, a pad member to which the signal line was coupled and a flexible printed circuit (FPC) to which a driver circuit was coupled were mounted on an edge of the substrate by using an anisotropic conductive film (ACF). At the same time, the pad member was electrically coupled to the FPC in order to send a signal from the driver circuit to a back substrate.

Finally, the electrophoretic display device EPD3 was completed by gluing a sheet to which the electrophoretic material was applied and a transparent counter electrode made of indium tin oxide (ITO) and the like together.

As described above, when a high resolution color display was manufactured, a signal line and the active matrix element AM took most of the pixel area because the minimum line width of the patterning by the ink-jet method was 30-50 μm. Therefore, in the conventional display, it was difficult to secure the sufficient area of a pixel electrode 2. However, as described above, the pixel electrode was formed to extend to the active matrix element AM by forming the second pixel electrode 2*b*. Therefore, it was possible to improve the aperture size since overall area of the first pixel electrode 2*a* and the second pixel electrode 2*b* was secured. Furthermore, it was possible to form the capacitor CA between the anterior gate electrode 6*a* and the second pixel electrode 2*b* by forming the conductive application film on the anterior gate electrode 6*a* that was provided anterior to the gate electrode 6*a* (gate line 6). Electric charge stored in the second pixel electrode 2*b* was stored in the capacitor CA when the active matrix element AM was not selected. As a result, leakage was decreased and a contrast rate was improved. For example, when a 200 ppi (125 μm angle per pixel) display was assumed, with the conventional structure, the aperture was about 30-40%. On the other hand, with the structure according to an example of the present invention was applied, the aperture improved to about 70-80%.

Moreover, only the data line 3 and the first pixel electrode 2*a* were patterned by photolithography and the rest of the process was conducted by the wet process at atmospheric pressure. Therefore, it was possible to form a display on a flexible and large substrate at low cost.

The invention claimed is:

1. A device comprising:
   a substrate;
   a first switching element formed on the substrate;
   a first pixel electrode formed on the substrate coupled to the first switching element;
   a second switching element formed on the substrate;
   a second pixel electrode formed over a portion of the second switching element;
   a third pixel electrode formed on the substrate and coupled to the first and second switching elements; and
   a fourth pixel electrode formed over the first switching element and coupled to the third pixel electrode.

2. The device according to claim 1, further comprising:
   a capacitor formed between the second pixel electrode and the second switching element.

3. The device according to claim 1, further comprising:
   a first capacitor formed between the fourth pixel electrode and the first switching element.

4. The device according to claim 3, further comprising:
   a second capacitor formed between the second pixel electrode and the second switching element.

5. The device according to claim 1, wherein the first and second switching elements are organic thin film transistors.

6. The device according to claim 1, further comprising:
   a counter substrate opposed to the substrate; and
   an electrooptical layer provided between the substrate and the counter substrate.

7. A method of manufacturing a portion of an electrooptical device on a substrate comprising the steps of:
   forming a first switching element on the substrate;
   forming a first pixel electrode on the substrate coupled to the first switching element;
   forming a second switching element on the substrate;
   forming a second pixel electrode over a portion of the second switching element;
   forming a third pixel electrode on the substrate and coupled to the first and second switching elements; and
   forming a fourth pixel electrode over the first switching element and coupled to the third pixel electrode.

8. The method of claim 7, wherein the second pixel electrode is formed by a wet process.

9. A region of an electrooptical device, comprising:
   a substrate;
   a first switching element formed on the substrate;
   a first pixel electrode formed on the substrate coupled to the switching element;
   a second switching element formed on the substrate;
   a second pixel electrode covering the second switching element;
   a third pixel electrode coupled to the second switching element; and a fourth pixel electrode formed over the first switching element and coupled to the third pixel electrode.

10. The region of an electrooptical device according to claim 9, further comprising:
   a capacitor formed between the second pixel electrode and the second switching element.

11. The region of the electrooptical device according to claim 9, wherein the first and second switching elements are organic thin film transistor.

12. An electrooptical device including the region of the electrooptical device according to claim 9 further comprising:
   a counter substrate opposed to the portion of the electrooptical device; and
   an electrooptical layer provided between the portion of the electrooptical device and the counter substrate.

13. Electronic equipment comprising the device according to claim 12.

14. An electrooptical device comprising:
   a substrate;
   a first transistor formed on the substrate;
   a second transistor formed on the substrate, the first transistor and the second transistor being located side by side, source electrodes of the first and second transistors being connected to a common data line;
   a first pixel electrode formed as a drain electrode of the first transistor;
   a second pixel electrode formed over the first transistor and connected to a drain electrode of the second transistor; and
   a capacitor formed between a gate of the first transistor and the second pixel electrode.

15. The electrooptical device according to claim 14, wherein the first and second transistors are organic thin film transistors.

16. The electrooptical device according to claim 14, wherein a source electrode of the first transistor has a comb teeth shape, and a part of the drain electrode has a comb teeth shape.

17. The electrooptical device according to claim 14, further comprising:
   a counter substrate opposed to the substrate; and
   an electrooptical layer provided between the substrate and the counter substrate.

18. An electrophoretic display comprising the electrooptical device according to claim 17.

* * * * *